United States Patent [19]

Tateishi et al.

[11] 4,181,960
[45] Jan. 1, 1980

[54] TAPE REEL AND DETECTOR ASSEMBLY FOR AN ELECTRONIC COMBINED DIGITAL SCALE AND CALCULATOR

[75] Inventors: Iwao Tateishi, Yamatokoriyama; Nobuyasu Kakutani, Yao, both of Japan

[73] Assignee: Sharp Kabushiki Kaisha, Osaka, Japan

[21] Appl. No.: 854,213

[22] Filed: Nov. 23, 1977

[30] Foreign Application Priority Data

Nov. 29, 1976 [JP]   Japan .................................. 51-145456

[51] Int. Cl.² ............................ G01B 3/08; G06F 7/38
[52] U.S. Cl. ...................................... 364/562; 33/138; 33/140; 235/92 DN; 364/705
[58] Field of Search ................................. 364/560–562, 364/705; 235/92 DN, 17 P; 33/121–124, 125 N, 125 R, 133, 137 R, 137 L, 140, 141 R; 242/84.8; 250/561

[56] References Cited

U.S. PATENT DOCUMENTS

| | | | |
|---|---|---|---|
| 3,811,648 | 5/1974 | Ream, Jr. et al. | 235/92 MP |
| 3,916,174 | 10/1975 | Moule | 364/562 |
| 4,031,360 | 6/1977 | Soule, Jr. | 235/92 MP |

OTHER PUBLICATIONS

Fields et al., "Accumulating Digitizer System"—The Review of Scientific Instruments; vol. 31, No. 12, Dec. 1960, pp. 1312–1317.

*Primary Examiner*—Errol A. Krass
*Attorney, Agent, or Firm*—Birch, Stewart, Kolasch & Birch

[57] ABSTRACT

A spring loaded reel is provided for accommodating and storing an extensible tape member which is useful in identifying the length of an object to be measured while being pulled out of an electronic combined digital scale and calculator. A plurality of holes are provided in the body of the spring loaded reel to detect the movement of the extensible tape member. A photo detector is positioned associated with the spring loaded reel to sense the rotation of the spring loaded reel in unison with the extensible tape member and to thereby provide counting signals. The counting signals are manipulated in a processor circuit included within the electronic digital scale and calculator to identify the movement of the extensible tape member.

18 Claims, 4 Drawing Figures

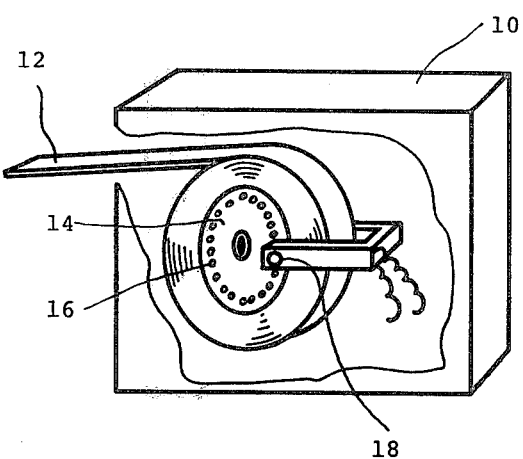
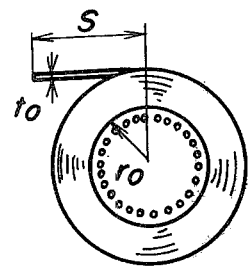
FIG. 1    FIG. 2
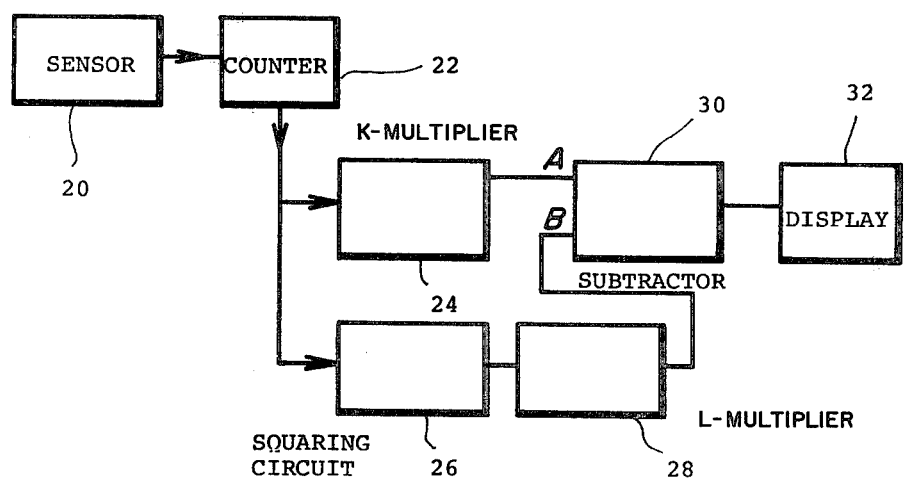
FIG. 3

TAPE REEL AND DETECTOR ASSEMBLY FOR AN ELECTRONIC COMBINED DIGITAL SCALE AND CALCULATOR

BACKGROUND OF THE INVENTION

The present invention relates to a combined electronic digital scale and calculator and, more particularly, to a tape detector for a combined electronic digital scale and calculator.

A prior art measurement instrument was disclosed in Taylor U.S. Pat. No. 3,780,440 "MEASUREMENT INSTRUMENT" issued on Dec. 25, 1973. An extensible tape member and a detector system for detecting the traveling of the tape member was proposed in the above prior art. The tape member is adjusted to an object to be measured by pulling it out of the measurement instrument to identify the length of the object being measured. The detector system determines the movement of the tape member through the use of an encoder unit which is energized in response to the rotation of a sloted disc associated with the movement of the tape member with a photo-sensitive system.

However, there is difficulty in composing the above measurement instrument in a compact system, because the detector system was complicated and the housing of the measurement instrument was large. And so a low-cost electronic digital scale could not be realized by the prior art detector system. A compact electronic digital scale is most desirable.

OBJECTS AND SUMMARY OF THE INVENTION

Accordingly, an object of the present invention is to provide an improved detector of an electronic digital scale by determining movement of an extensible tape member included within the electronic digital scale.

Another object of the present invention is to provide a compact and low cost electronic digital scale which comprises an improved detector for detecting the movement of an extensible tape member which is extended out of the housing of an electronic digital scale.

Still another object of the present invention is to provide an improved combined electronic digital scale and calculator which includes a compact detector which determines the movement of an extensible tape member housed therein.

Other objects and further scope of applicability of the present invention will become apparent from the detailed description given hereinafter. It should be understood, however, that the detailed description and specific examples, while indicating preferred embodiements of the invention, are given by way of illustration only, since various changes and modifications within the spirit and scope of the invention will become apparent to those skilled in the art from this detailed description.

To achieve the above objects, pursuant to an embodiment of the present invention, a spring loaded reel which accommodates and stores an extensible tape member is provided. The extensbile tape member is adjusted in an amount of extension from the body of an electronic scale to correspond to the length of an object to be measured by pulling it out of the housing of a combined electronic digital scale and calculator thereby determining the length of the object is measured. In unison with traveling of the extensible tape member, the spring loaded reel is rotated. A plurality of holes are provided in the spring loaded reel for detecting the rotation of the spring loaded reel. A photo detector comprising a light emitting device and a light sensing element is positioned associated with the spring loaded reel to generate counting signals in response to the rotation of the spring loaded reel by detecting the number of a plurality of light beams passing through the holes as the spring loaded reel rotates.

The counting signals are introduced into a processor circuit, and thereafter a display. The counter functions to count the number of the counting signals thereby generating signals to be input to an amendment circuit. The amendment circuit manipulates the signals in such a way as to measure the movement of the extensible tape member so that the number of rotations of the spring loaded reel is varied as a function of drawn out length of the extensible tape member.

That is, the amendment circuit is provided to compensate for variation in the rotating velocity of the spring loaded reel, said compensation depending upon the remaining amount of the extensible tape member not pulled out of the housing.

Distance information is transmitted into the display from the amendment circuit for displaying purposes. The combined electronic digital scale and calculator also functions as a well-known electronic calculator which calculates information introduced into the electronic digital scale.

In another embodiment of the present invention, graduations are further provided on the extensible tape member for determining the length of the object through the use of operator's vision. When the extensible tape member is extended to fit the object being measured, the length of the object can be recognized by the operators.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a partially cutaway view of an embodiment of a combined electronic digital scale and calculator embodying the present invention, showing an extensible tape member and a spring loaded reel included within the combined electronic digital scale and calculator.

FIG. 2 is an elevational view of the extensible tape member and the spring loaded reel shown in FIG. 1;

FIG. 3 is a processor circuit which is used to determine the movement of the extensible tape member.

DESCRIPTION OF THE PREFERRED EMBODIMENTS

Figure 4:
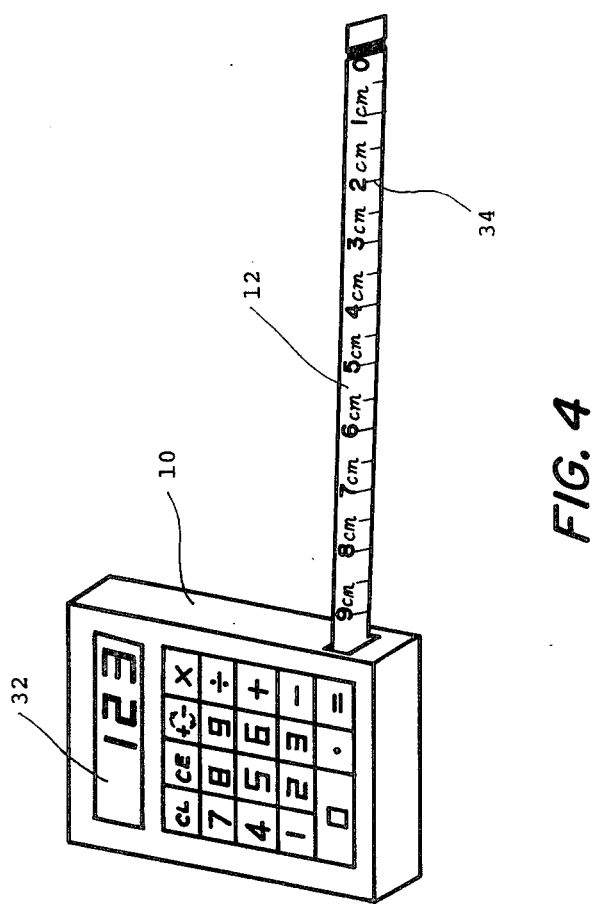
FIG. 4 is a perspective view of a combined electronic digital scale and calculator of another embodiment of the present invention.

Referring now in detail to the drawings, and to facilitate a more complete understanding of the present invention, FIG. 1 shows a combined electronic digital scale and calculator 10 of an embodiment of the present invention comprising an extensible member 12 and a spring loaded reel 14.

The combined electronic digital scale and calculator 10 functions like the well-known electronic calculator which manipulates information introduced into a calculation circuit through the use of a key board formed on the electronic digital calculator although the combined electronic digital scale and calculator 10 illustrated in FIG. 1 does not show the key board. The key board comprises ten digit keys for providing numeral information and command keys for giving commands how to manipulate the numeral information.

A plurality of holes 16 are provided in the body of the spring loaded reel 14 associated with a photo detector 18. The extensible tape member 12 may be drawn-out from the housing of the combined electronic digital scale and calculator 10 to be fitted to an object to be measured to measure the length of the object. The spring loaded reel 14 is rotated in unison with the movement of the extensible tape member 12 by constantly forcing the extensible tape member 12 backward into the housing of the combined electronic digital scale and calculator 10 through the use of a spring thereof (not shown).

The photo detector 18 comprises a light emitting element and a light receiving element. The light emitting device emits light beams of constant intensity toward the spring loaded reel 16 while the combined electronic digital scale and calculator 10 is operating. The light beams can pass through the holes 16 formed in the body of the spring loaded reel 14 and then reach the light receiving element. The light receiving element develops counting signals in response to the light beams received thereon.

The counting signals are utilized to detect the movement of the extensible tape member 12 after being processed by a processor circuit described hereinbelow.

FIG. 2 illustrates the extensible tape member 12 and the spring loaded reel 14 which accommodates and stores the extensible tape member 12 therein. Now it is defined that $t_0$ is the thickness of the extensible tape member 12 and $r_0$ is the radius of the spring loaded reel 14 to formulate a detection system of the combined electronic digital scale and calculator 10.

Assume that S is the amount of the extended length of the extensible tape member 12 in its initial measuring position where it is completely housed within the spring loaded reel 14, in other words, in the housing of the combined electronic digital scale and calculator 10. The spring loaded reel 14 is rotated through a rotation angle $\theta$ represented by the following equation (1):

$$\theta = \frac{2\pi}{t_0} \left[ \sqrt{r_0^2 + \frac{t_0 l_0}{\pi}} - \sqrt{r_0^2 + \frac{t_0(l_0 - S)}{\pi}} \right] \quad (1)$$

wherein $l_0$ is the total length of the extensible tape member 12.

In accordance with the equation (1), the draw-out length S is given by the following equation (2).

$$S = \theta \sqrt{r_0^2 + \frac{t_0 l_0}{\pi}} - \frac{t_0}{4\pi} \theta^2 \quad (2)$$

When the number of holes 16, disposed in the body of the spring loaded reel 14 are n holes, the rotation angle of the spring loaded reel 14 between each hole 16 is $2\pi/n$ radian. When the number of the counting signals developed by the light receiving element of the photo detector 18 are defined as m, the rotation angle $\theta$ is $2\pi m/n$. The draw-out length S is further represented by the following equation (3).

$$S = \frac{2\pi m}{n} \sqrt{r_0^2 + \frac{t_0 l_0}{\pi}} - \frac{\pi t_0}{n^2} m^2 \quad (3)$$

Defining now $$\sqrt{r_0^2 + \frac{t_0 l_0}{\pi}}$$

as K and $\pi t_0 /n^2$ as L, an equation (4) is obtained:

$$S = Km - Lm^2 \ldots \quad (4)$$

The equation (4) is utilized to detect the movement of the extensible tape member 12 by the processor circuit of the combined electronic digital scale and calculator 10.

FIG. 3 illustrates the processor circuit implemented by the combined electronic digital scale and calculator 10 for detect the movement length of the extensible tape member 12. The processor circuit comprises a sensor 20, a counter 22, a K-multiplier 24, a squaring circuit 26, an L-multiplier 28, a subtractor 30, and a display 32. The sensor 20 is associated with the photo detector 18 shown in FIG. 1.

The counter 22 functions to count the number m of the counting signals derived from the sensor 20 to provide the outputs to the K-multiplier 24 and the L-multiplier 26. The K-multiplier 24 is used to multiply the number m by the K and the squaring circuit 26 functions to raise the number m to second power. The output signals representing $m^2$ of the squaring circuit 26 are introduced into the L-multiplier 28 so that the L-multiplier 28 funcions to multiply the output signals by the L.

An output A derived from the K-multiplier 24 provides information of Km contained in the equation (4). Similarly, an output B developed from the L-multiplier 28 provides information of $Lm^2$ contained in the equation (4). These outputs A and B are entered into the subtractor 30 to determine the draw-out length S in accordance with the equation (4). The results developed from the subtractor 30 are introduced into the display 32 such as a liquid crystal display. Therefore, the draw-out length S is visually indicated in the display 32.

FIG. 4 shows another embodiment of the present invention, wherein the extensible tape member 12 of the combined electronic digital scale and calculator 10 has graduations on the surface thereof. The graduations formed on the extensible tape member 12 can be utilized for identifying the length of the object by directly fitting of the extensible tape member 12 to the object. The graduations can be provided on one or both surfaces of the extensible tape member 12.

The display 32 such as liquid crystal display indicates the length information measured by the extensible tape member 12 as described above.

The invention being thus described, it will be obvious that the same may be varied in many ways. Such variations are not to be regarded as a departure from the spirit and scope of the invention, the scope of the following claims.

What is claimed is:

1. A combined electronic digital scale and calculator comprising:

a housing:

an extensible member means secured within said housing for determining a dimension of an object to be measured, said extensible member means having a predetermined total length and thickness, said total length being equal to the sum of the distance that the extensible member extends from said housing and the length of said extensible member remaining within said housing;

reel means having a predetermined radius, said reel means having said extensible member means wound thereon for accommodating and storing said extensible member within said housing, said reel means having a varying rotational velocity depending upon the amount of said extensible member wound on said reel;

detector means directly associated with said reel means for detecting the rotation of said reel means and generating an output signal indicative of the degree of rotation of said reel means; and amendment circuit means responsive to said output signal of said detector means for continuously modifying said output signal of said detector means as a function of said amount of said extensible member wound on said reel means for generating length signals which accurately correspond to the length of said extensible member extending from said housing and said dimension of said object;

whereby said amendment circuit means compensates for the nonlinear relationship between the distance that said extensible member extends from said housing and said varying velocity of rotation of said reel means.

2. The combined electronic digital scale and calculator as specified in claim 1, wherein said detector means comprises a plurality of holes formed in the reel means, said plurality equal to a predetermined number.

3. The combined electronic digital scale and calculator as specified in claim 2, wherein said detector means further comprises a photodetector means including a light emitting means and a light receiving means for sensing the number of said holes passing said photodetector means when said reel means is rotated.

4. The combined electronic digital scale and calculator as specified in claim 3, wherein said amendment circuit comprises a counter means responsive to said photodetector means for counting said number of holes passing said photodetector means and generating a first and second control signal; a first multiplier means responsive to said first control signal for multiplying said first control signal by a first value generating a K control signal; a squaring circuit means responsive to said second control signal for raising said second control signal to a second power generating a second control squared output signal; a second multiplier means responsive to said second control squared output signal for multiplying said second control squared output signal by a second value generating an L control signal; and a subtractor means responsive to said K control signal and said L control signal for subtracting said L control signal from said K control signal thereby generating a length signal, said length signal indicative of the length of said extensible member extending from said housing.

5. The combined electronic digital scale and calculator as specified in claim 4, wherein said first value is defined as a function of said radius of said spring loaded reel, said total length of said extensible member and said thickness of said extensible member; said second value being defined as a function of said thickness of said extensible member and said predetermined number (n) of said holes on said body of said reel means.

6. The combined electronic digital scale and calculator as specified in claim 1, further comprising a display means for indicating said dimension of said object.

7. A combined electronic digital scale and calculator comprising:

a housing;

an extensible member means secured within said housing and having a predetermined total length for being fitted to an object to be measured said total length comprising a first extended distance, said first extended distance being the length of said extensible member which is pulled out from said housing;

reel means having a body and a radius, said reel supporting said extensible member means for storing said extensible member;

a plurality of holes provided in said body of said spring loaded reel means spaced at predetermined intervals from each other;

generator means adjacent to said reel means and activated through the use of said holes on said body of said reel means for generating counting signals corresponding to said number of holes passing said generator means; and a processor means responsive to said counting signals for modifying said counting signal to generate length signals S in accordance with the following equation:

$$S = \frac{2\pi m}{n} \sqrt{r_0^2 + \frac{t_0 l_0}{\pi} - \frac{\pi t_0 m^2}{n^2}}$$

wherein S is said first extended distance of said extensible member, m is said number of said counting signals, n is said predetermined interval of said holes, $r_0$ is said radius of said reel means, $t_0$ is the thickness of said extensible member and $l_0$ is said total length of said extensible member.

8. A handheld electronic device, for use in calculating and measuring, comprising:

a housing having a calculator keyboard positioned thereon, said keyboard having numeral and function keys;

a rotatable reel means mounted within said housing;

an extensible member means coiled on said reel means, within said housing and adapted to be pulled out from said housing, for measuring the length of an object to be measured said extensible member means having a total length equal to a first and second distance, said first distance being the length of said extensible member means which is pulled out from said housing, said second distance being the length of said extensible member means mounted on said reel means and remaining in said housing;

sensing means responsive to the rotations of said reel means when said extensible member is pulled out from said housing, for sensing the degree of rotations of said reel means, said degree being proportional to said first distance, said sensing means thereby generating output signals indicative of the length of said first distance of said extensible member means when said extensible member means is pulled out from said housing, said reel means on which said extensible member means is mounted, being rotated when said extensible member means is pulled out from said housing, the rotational velocity of said reel means varying nonlinearly with said second distance; and processor means, responsive to said output signals, for generating length signals as a function of said first distance of said extensible member and of the rotational velocity of said reel means on which said coiled extensible member is mounted, thereby compensating for a nonlinear relationship between said first distance of said extensible member and the varying velocity of rotation of said reel means when said extensible member means is pulled out from said housing.

9. A handheld electronic device in accordance with claim 8, wherein said sensing means comprises:

a spring loaded reel means for supporting said coiled extensible member, said reel having a body;

a photodetector means, on both sides of said body of said spring loaded reel means, for emitting light from a light-emitting means and receiving light at a light receiving means; and a plurality of hole means on said body of said spring loaded reel means and interposed between said light emitting means and said light receiving means for permitting said light from said light emitting means to pass through said plurality of holes on said body of said spring loaded reel means, said light being received by said light receiving means of said photodetector means thereby generating counting signals.

10. A handheld electronic device in accordance with claim 9, wherein said body of said spring loaded reel means associated with said sensing means comprises at least one disk-shaped object supported at its center by a central shaft, said shaft supporting said coiled extensible member, said plurality of holes located at predetermined intervals around a periphery of said at least one disk-shaped object.

11. A handheld electronic device in accordance with claim 10, wherein said processor means comprises:

counter means, responsive to said counting signals, for adding said counting signals thereby generating a control signal, said control signal being representative of said first extended distance of said extensible member, said control signals comprising a first and second control signal;

a first multiplier means, responsive to said first control signal, for multiplying said first control signal by a first constant thereby generating a K-control signal;

a squaring circuit means, responsive to said second control signal, for squaring said second control signal thereby generating a second squared control signal;

a second multiplying means, responsive to said second squared control signal, for multiplying said second squared control signal by a second constant thereby generating an L-control signal; and subtractor means responsive to both said K-control and L-control signals for subtracting said L-control signal from said K-control signal thereby generating a length signal.

12. A handheld electronic device in accordance with claim 11, wherein said processor means further comprises:

display means, responsive to said length signal, for displaying said length signal, said length signal representative of said first extended distance of said extensible member.

13. A handheld electronic device in accordance with claim 12, wherein said first constant is expressed by the following formula:

$$\sqrt{r_0^2 + \frac{t_0 l_0}{\pi}}$$

where $r_0$ represents a radius of a disk-shaped object associated with said sensing means, to represent a thickness of said extensible member, and $l_0$ represents a total length of said extensible member.

14. A handheld electronic device in accordance with claim 13, wherein said second constant is expressed by the following formula:

$$\pi t_0/n^2$$

where $t_0$ represents a thickness of said extensible member and n represents a total number of holes associated with said sensing means.

15. A handheld electronic device in accordance with claim 8, wherein said processor means comprises:

counter means, responsive to said counting signals, for adding said counting signals thereby generating a control signal, said control signal being representative of said first extended distance of said extensible member, said control signal comprising a first and second control signal;

a first multiplier means, responsive to said first control signal, for multiplying said first control signal by a first constant thereby generating a K-control signal;

a squaring circuit means, responsive to said second control signal, for squaring said second control signal thereby generating a second squared control signal;

a second multiplying means, responsive to said second squared control signal, for multiplying said second squared control signal by a second constant thereby generating an L-control signal; and subtractor means responsive to both said K-control and L-control signals for substracting said L-control signal from said K-control signal thereby generating a length signal.

16. A handheld electronic device in accordance with claim 15, wherein said processor means further comprises:

display means, responsive to said length signal, for displaying said length signal, said length signal representative of said first extended distance of said extensible member.

17. A handheld electronic device in accordance with claim 15, wherein said first constant is expressed by the following formula:

$$\sqrt{r_0^2 + \frac{t_0 l_0}{\pi}}$$

where $r_0$ represents a radius of a disk-shaped object associated with said sensing means, $t_0$ represents a thickness of said extensible member, and $l_0$ represents a total length of said extensible member.

18. A handheld electronic device in accordance with claim 15, wherein said second constant is expressed by the following formula:

$$\pi t_0/n^2$$

where $t_0$ represents a thickness of said extensible member and n represents a total number of holes associated with said body of said sensing means.

* * * * *